INVENTOR
KARL FRIEDRICH NÄGELE
by E. M. Squire
his attorney

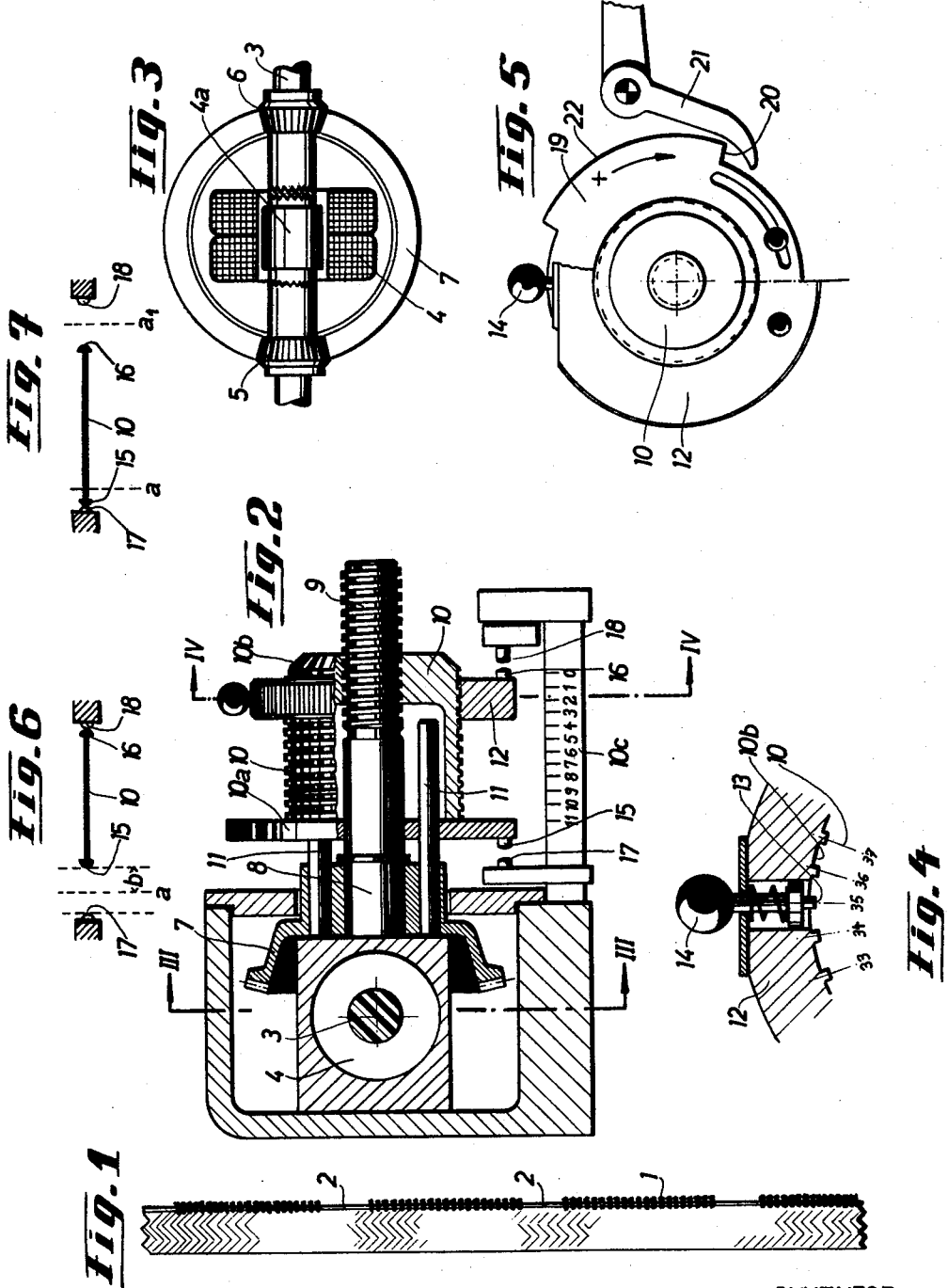

United States Patent Office 3,142,895
Patented Aug. 4, 1964

3,142,895
CONTROL DEVICE BY WHICH THE COUPLING LENGTHS OF SLIDE FASTENERS AND THE INTERMEDIATE SPACES BETWEEN ADJACENT COUPLING LENGTHS OF SLIDE FASTENERS ARE DETERMINED
Karl Friedrich Nägele, Osumstrasse, Stuttgart-Hohenheim, Germany
Filed June 25, 1963, Ser. No. 290,493
9 Claims. (Cl. 29—208)

This invention relates to a control device by which the coupling lengths of slide fasteners and the intermediate spaces between adjacent coupling lengths of slide fasteners are determined. This control device is used in connection with machines for manufacturing slide fasteners, in which a plurality of coupling links are secured in rows of predetermined lengths to a continuous carrier tape, between which rows spaces, also of predetermined lengths, are provided which are void of coupling links, and in which the mechanism of the machine for securing the coupling links is controlled by the control device which is connected to the machine by a connecting shaft.

In continuously manufacturing coupling links carrying tapes for slide fasteners it is known to pass a carrier tape continuously through a machine and to feed coupling links along a desired length of the carrier tape to the carrier tape and then to stop the feeding of coupling links for a certain interval, whereupon coupling links are fed anew to the carrier tape etc. The length of the row of coupling links is determined by the stop of feeding coupling links, while the time, during which the feeding stop is effective, determines the required spacing between two lengths of the slide fastener halves, i.e. the intermediate spaces which are void of coupling links. The coupling links may be fed singly in succession to the carrier tape as well as in consistent rows of links for example in form of a desired length of helical spring which is cut from a helical spring which may have any length, in which latter case, after a length has been cut off, the feeding of the next length is stopped while moving the carrier tape through the desired length, whereby the required intermediate spaces are obtained which are void of coupling links.

In order to achieve the control of feeding coupling links and stopping the same it is known already to use endless perforated bands, or cam chains which are formed in such a way that after a certain number of coupling links have been fed to the carrier tape the feeding is interrupted to obtain the intermediate space between two rows of coupling links which is void of coupling links. Also electronic controls are known operating with counting valves, or the like which, however, are very complicated and operate in dependence on the time, which involves a complicated adjustment when the length of the rows of coupling links on the carrier tape is changed.

In view of the prior known art it is an object of the invention to provide a control device allowing to adjust the length of carrier tape to be provided with coupling links and also the length of the intermediate space which is void of coupling links in a simple manner and with one grip.

Another object is to provide a control device adapted to operate with absolute safety at high working speeds.

To this end the above mentioned device is characterized according to the invention in that the continuously driven connecting shaft of a coupling link mounting machine is driving via a reversible gearing a control nut to reciprocate between two end positions said nut comprising two cams effective to operate electrical or mechanical reversing control means of said reversible gearing, said cams being spacedly arranged from each other in an adjustable manner, while an adjustable cam disc is connected to said control nut, or to a control ring respectively, by means of which cam disc feeding of coupling links to the mounting spots on the carrier tape is interruptable by an operating lever according to the length of the space void of coupling links.

The invention shall now be described in connection with one embodiment shown by way of example in the drawings, in which:

FIG. 1 is one half of a slide fastener to which equally long rows of coupling links are secured and arranged with equal spaces between these rows;

FIG. 2 is a longitudinal sectional view of the device controlling the length of the rows of coupling links and the sections void of coupling links;

FIG. 3 is a sectional view taken along the line III—III in FIG. 2 in which the housing has been omitted;

FIG. 4 is a partial sectional view along the line IV—IV in FIG. 2;

FIG. 5 is a front view of the axially shiftable part together with an adjustable control cam;

FIGS. 6 and 7 are two diagrams illustrating the switching positions of the axially shiftable part;

Figure 8:
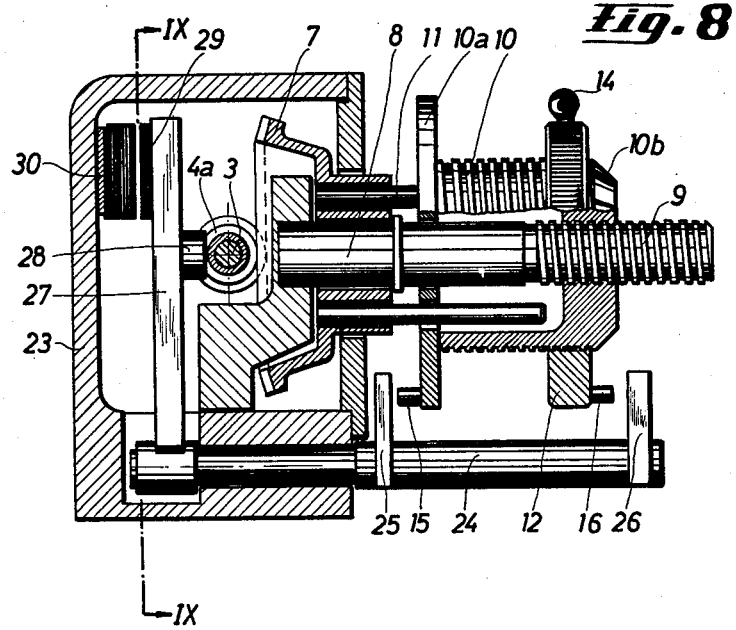
FIG. 8 is a longitudinal sectional view corresponding to FIG. 2 in which, however, the reversible gearing is switched mechanically.

In manufacturing slide fasteners commonly a carrier tape, which may be endless, or of any desired length, is, according to FIG. 1, provided with a predetermined equal number of coupling links 1, between each row of which a section 2 which is void of coupling links is provided.

Now, in order to be able to adjust the lengths of the rows of coupling links and of the spaces void of links a connecting shaft 3 is securely connected to the drive of a machine which in predetermined cycles, for example at each revolution, secures a couping link to an endless carrier tape. A pair of bevel gears 5 and 6 are freely rotatably mounted on the connecting shaft 3. Each of the bevel gears may selectively be coupled to the shaft 3 by a solenoid operated coupling 4. The bevel gears 5 and 6 are diametrically opposed to each other and are meshing with a control bevel gear 7, which is loosely mounted on a nonrotatable axle and may be driven by the bevel gear 5 in one direction and by bevel gear 6 in the other direction. The stationary axle 8 has a threaded spindle 9 formed at its free end. A cylindrical control nut 10 is guided on this threaded spindle 9 shifting in axial direction according to the pitch of the thread, said control nut including at its end facing the control bevel gear 7 a control flange 10a which is axially slidably supported on the axle 8. Carrier dogs 11 in form of axially extending parallel rods are rigidly connected to the control bevel gear 7 the free ends of which extending into the control nut 10. Mounted on the free end of the control nut 10 is a control ring 12 adjustable in axial direction relative to the control nut 10, for example in such a manner that the control ring 12 engages with an inner thread, an outer thread of the control nut 10 whereby the control ring may be axially displaced by rotating it. In order to fix the position of the control ring 12 relative to the control nut 10 a spring load locking pin 13 is provided engaging corresponding recesses on the outer cylindrical surface of the control nut 10, as shown in FIG. 4. For adjusting the locking pin 13 it is merely necessary to actuate it with the handle 14 against the force of the spring until it engages a desired recess, as will be described yet.

The control flange 10a and the control ring 12 of the control nut 10 are each provided with a trigger cam 15 and 16 arranged on the sides facing away from each other, and opposed to these trigger cams electrical limit switches 17 and 18 are arranged. The trigger cam 15 and the limit switch 17 are electrically connected to the solenoid actuated coupling 4 in such a manner that one of the coils of the coupling 4 is connected to the poles of an energy source when the limit switch 17 is actuated, while the other coil of the coupling 4 is connected to the energy source when the limit switch 18 is actuated by the trigger cam 16, whereby, upon alternate closing of the limit switches 17, 18 either the bevel gear 5, or the bevel gear 6, which are driven by the shaft 3, are correspondingly coupled with the control bevel gear 7 by the shiftable coupling sleeve 4a. By means of the connecting shaft 3, which is rotating constantly in one direction, and by coupling one of the bevel gears 5, or 6 respectively, to the shaft 3 the control bevel gear 7 is accordingly rotated in opposite directions, and also rotates, by means of the carrier dogs 11 the control nut 10 in opposite directions whereby, due to the threaded engagement between the control nut and the threaded spindle 9, the control nut is either moved away from the limit switch 17 and towards the limit switch 18, or vice versa. As soon as the trigger cam 16 engages the stationary limit switch 18 the poles of the coupling 4 are reversed and thus the coupling sleeve 4a is shifted in opposite direction causing the control bevel gear 7 to rotate in opposite direction, whereby the control nut 10 moves back to the stationary limit switch 17 until the trigger cam 15 engages the limit switch 17, whereby the poles of the coupling 4 are reversed again causing a reversal of the direction of movement of the control nut 10. The transmission ratio between the machine driven connecting shaft 3 and the control bevel gear is selected in such a way that the control bevel gear 7 rotates very slowly relative to the shaft 3, for example at a ratio of 1:100 so that one complete revolution of the control bevel gear 7 and thus of the control nut, if for example one coupling link is fed to the carrier tape upon each revolution of the machine drive and the shaft 3, corresponds to securing 100 coupling links to the carrier tape. Now the length of the shifting path of the control nut 10 is, by correspondingly selecting the spacing between the limit switches 17 and 18, or the trigger cams 15 and 16, such that upon one revolution of the control nut 10 at each advance and return movement the advance and return movement together correspond to securing 200 coupling links to the carrier tape without the predetermined space between the rows of coupling links which is void of coupling links. The number 100 is merely selected as an example and may, by correspondingly rotating the control ring 12 on the control nut 10, be adjusted to any smaller or greater number. To this end a scale from 1 through 100 is provided at 10b on the face side of the control nut as, shown in FIG. 4. Besides this a scale 10c is provided below the control nut 10 in parallel relation to the shaft 3 each mark of the graduation of this scale corresponding to one thread pitch of the threaded spindle 9, whereby it is possible to adjust, or read respectively, a multiple of 100 on this scale.

In order to allow actuation of a control during the reciprocating movement of the control nut 10, by means of which the feeding of coupling links to the carrier tape is stopped, a cam disc 19 is coupled to the control nut 10. A trigger cam 20 is provided on the cam disc cooperating with an actuating lever 21 which, upon engaging the trigger cam 20 is rotated, thereby blocking the feed of coupling links to the carrier tape by means of interconnecting members. A cam surface 22 of a defined length extends from the trigger cam 20, the purpose of which shall be described later. The cam disc 19 may be adjusted relative to the control ring 12 and locked in its position whereby the location where the trigger cam 20 engages the actuating lever 21 may be adjusted and thus the length of the space on the carrier tape which is void of coupling links.

The device operates in the following manner:

Assuming that the rotating direction of the control bevel gear 7 is reversed upon actuating the limit switch 17 by the trigger cam 15, then the control nut 10 will move towards the right when viewing the drawing. During the advance movement towards the right the trigger cam 20 will release the actuating lever 21 before the limit switch 18 is actuated by the trigger cam 16. According to the diagram shown in FIG. 6 this is to take place at the point $a$. In this moment the feed of coupling links to the carrier tape is released until, after actuating the limit switch 18 by the adjustable trigger cam 16, the poles of the coupling 4 are reversed causing a return movement of the control nut 10. Only upon continued return movement of the control nut, or the cam disc 19 respectively which is connected to the control ring 12, the feed of coupling links to the carrier tape is blocked again when the actuating lever runs off of the cam surface 22. According to FIG. 6 the feed of coupling links to the mounting location is released from the point $a$ to the actuation of the limit switch 17 by the trigger cam 15 and back again until the point $a$ is reached again, whereupon, by lifting the actuating lever 21, the feed is blocked again until, upon return movement, the point $a$ is reached again. However, it is also possible, with respect to the releasing and blocking of feeding coupling links to shift the point $a$ towards the other end of movement. Therefore the total length of the advance and return movement of the control nut 10 determines the length of the carrier tape to be provided with coupling links including the space between two succeeding rows of coupling links which is void of coupling links. As has been mentioned already the number of coupling links in each row may be changed at random by adjusting the control ring 12 readable on the scale 10b and the coarse scale 10c, since by adjusting the control ring 12 the difference of the fixed distance between the limit switches 17 and 18 on the one hand, and of the adjustable distance between the trigger cams 15 and 16 on the other hand is altered. The smaller the number of the coupling links to be mounted the less becomes this difference, and vice versa.

It would also be possible to provide an adjustable trigger cam 20 with corresponding actuating levers 21 at each end of the control nut 10 which would correspond to the diagram shown in FIG. 7. If in this case it is assumed that the trigger cam 15 actuates the limit switch 17, then the direction of movement is changed toward the right. By a corresponding trigger cam 20 arranged on the left hand side of the control nut 10 the feed of coupling links to the carrier tape is initially blocked until the point $a$ is reached, where a corresponding actuating lever 21 slides off of the trigger cam 20. In this moment the feed of coupling links to the carrier tape starts again, until the control nut 10 has reached that position in which the right hand trigger cam 20 at the point $a_1$ lifts another actuating lever 21, thus blocking the feed of coupling links again, until the return movement has started, and the position of the control nut 10 has reached the point $a_1$ again. Then the feed of coupling links starts again, until the control nut 10 has reached the point $a$, where the feed of coupling links is blocked again etc. Of course it is also possible to actuate switches by the trigger cam 20 instead of actuating a lever 21, and by closing the contacts to actuate control means by magnets for blocking the feed of coupling links. The above description of an embodiment is only by way of example.

Electromagnetic reversing controls of the reversible gearing, as described in connection with FIGS. 1–7 are afflicted with a magnetic hysteresis by which a required prompt reversing of the reversible gearing is retarded. The reversing should take place as quick as possible during a time of $\frac{1}{500}$–$\frac{1}{200}$ second. In order to avoid such a time delay in reversing, a mechanical reversing control may be used according to the invention which shall be described now.

Figure 9:
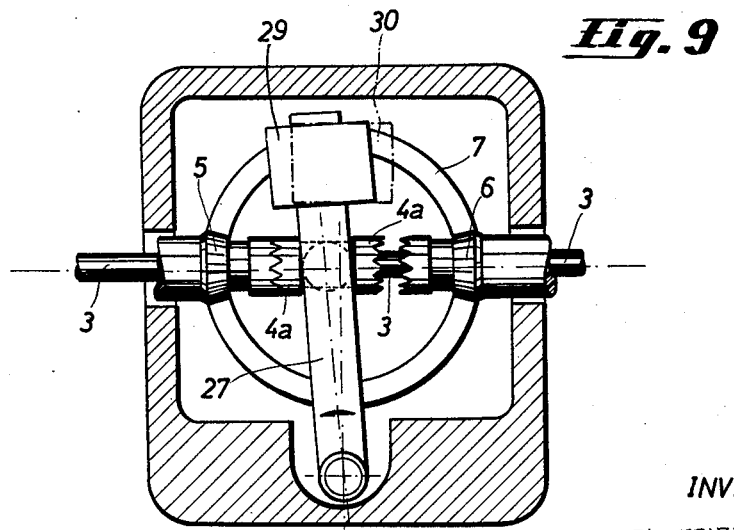
FIG. 9 is a cross sectional view along the line IX—IX in FIG. 8.

The electrical limit switches 17 and 18 according to FIG. 2 are according to FIGS. 8 and 9 replaced by a shaft 24 rotatably supported in the housing 23 in parallel relation to the spindle 9. Mounted on the shaft 24 are two abutment levers 25 and 26. A lever arm is mounted on the end of the shaft 24 disposed within the housing 23 engaging with a pin 28 an annular groove 4b of the coupling sleeve 4a which is provided with radial serrations at both ends and is nonrotatably but axially shiftably mounted on the shaft 3. The free end of the lever arm 27 carries in a fork a permanent magnet 29, and opposed to this permanent magnet 29 a stationary permanent magnet is arranged in such a way that equal poles, for example the north poles, of the permanent magnets 29 and 30 are opposed to each other thereby tending to repel each other.

When the nut 10 is axially shifted in one direction the cam 15 will engage the abutment lever 25 causing the shaft 24 to rotate promptly whereby, by the aid of the lever arm 27 and the pin 28, the coupling sleeve 4a engages, for example the bevel gear 5, thus reversing the rotating direction of the bevel gear 7 and the nut 10. In this the stoppage of the arm 27 is assured by the eccentric position of the arm 27 with respect to the stationary magnet 30 and the poles opposed to each other. In this, sections of the magnets 29 and 30 are magnetized in such a way that in the middle position of the arm 27 similar poles, for example north poles, which are repelling each other are opposed, while in both angular positions of the arm 27 opposite poles which are attracting each other are opposed, whereby the fast reversing is favored. By reversing the direction of rotation of the nut 10 the trigger cam 16 subsequently engages the abutment lever 26, whereby the shaft 24 again is rotated promptly in the opposite direction causing the lever arm 27 to shift the coupling sleeve 4a in a direction towards the bevel gear 6, thereby again reversing the direction of rotation of the bevel gear 7 and the nut 10. Thus a prompt reversing of the direction of rotation of the nut is obtained in a mechanical manner as is required in practice.

What I claim is:

1. In a machine for securing coupling links of slide fasteners to a continuous carrier tape in which the coupling links are forming rows of predetermined equal lengths, said rows being spaced by equal sections of predetermined lengths which are void of coupling links, a control device for determining the lengths of said rows of coupling links and the lengths of said intermediate spaces which are void of coupling links, comprising a housing; reversible transmission means arranged within said housing; a connecting shaft operatively connecting said reversible transmission means with the coupling links securing mechanism of said machine so as to continuously drive said reversible transmission means; driving members of said reversible transmission means; journalled freely rotatably on said connecting shaft; coupling means for selectively coupling one of said driving members to said connecting shaft; a stationary spindle secured to said housing; a driven member of said reversible transmission means journalled freely rotatably on said staationary spindle and drivingly connected with said driving members; a control nut threadedly engaging said spindle and drivingly connected to said driven member said control nut reciprocating between two end positions in dependence on coupling the driving members of said reversible trasmission means alternately to said connecting shaft; cam means provided on said control nut in axially spaced relation; control means engaged by said cam means actuating said coupling means for reversing said reversible transmission means, the axially spaced relation between said control means and said cam means being adjustable; a cam disc adjustably mounted on said control nut cooperating with an actuating lever, whereby, via interconnecting links, the feed of said coupling links to the securing location on said carrier tape is interruptable corresponding to the length of said intermediate spaces which are void of coupling links.

2. A control device according to claim 1, wherein said control means for reversing said reversible transmission means comprise two electrical limit switches cooperating with said cam means each of said limit switches being connected with the coil of a solenoid operated coupling for said driving members of said reversible transmission means in such a way that by alternately actuating said limit switches the poles of said solenoid operated coupling are reversed, whereby a coupling sleeve axially shiftably but nonrotatably mounted on said connecting shaft and forming the armature of said solenoid is shifted to alternately couple said driving members to said connecting shaft.

3. A control device according to claim 1, wherein a mechanical reversing control of said reversible transmission means comprises a shaft rotatably supoprted in said housing in parallel relation to the axis of said control nut, said shaft having two abutment levers secured thereto spaced in axial direction which are engageable by said cam means, a lever arm being secured to the end of said shaft which is disposed within said housing, interconnecting drive means between said lever arm and a coupling sleeve which is axially shiftably but nonrotatably mounted on said connecting shaft, said drive means becoming effective to couple either of said driving members of said reversible transmission means to said connecting shaft in dependence on said cam means engaging said abutment levers.

4. A control device according to claim 3, wherein said interconnecting drive means between said lever arm and said coupling sleeve is formed by a pin provided on said lever arm which is engaging an annular groove of said coupling sleeve.

5. A control device according to claim 3, wherein said lever arm has a first permanent magnet mounted at its free end, a second stationary permanent magnet is arranged opposite to said first permanent magnet.

6. A control device according to claim 1, in which said reversible transmission means simultaneously forms a speed-reducer drive, and in which said driving members and said driven member are formed by bevel gears constantly meshing with each other.

7. A control device according to claim 1, wherein the axial distance between said cam means is adjustable by a control ring provided with a threaded bore screwed upon an outside thread provided on said control nut, said control ring being lockable in its adjusted position by a spring loaded pin engaging axially extending grooves spaced evenly around the circumference of said control nut.

8. A control device according to claim 1, wherein the axial distance between said cam means is adjustable by a control ring provided with a threaded bore screwed upon an outside thread provided on said control nut, said control ring being lockable in its adjusted position by a spring loaded pin engaging axially extending grooves spaced evenly around the circumference of said control nut, said cam disc determining the length of said intermediate space which is void of coupling links being adjustably mounted on said control ring.

9. A control device according to claim 8, wherein always one adjustable cam and one actuating lever are cooperating with said control nut and said control ring for stopping the feed of coupling links to said carrier tape.

References Cited in the file of this patent

UNITED STATES PATENTS 2,896,313     Brewer et al. _____ July 28, 1959